(12) United States Patent
Manders

(10) Patent No.: US 6,325,453 B1
(45) Date of Patent: Dec. 4, 2001

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/616,172

(22) Filed: Jul. 14, 2000

(30) Foreign Application Priority Data

Jul. 20, 1999 (NL) .................................................... 1012646

(51) Int. Cl.$^7$ .................................................... B60J 7/057

(52) U.S. Cl. ........................................................... 296/223

(58) Field of Search .................................. 296/221–224

(56) References Cited

U.S. PATENT DOCUMENTS

| | | | |
|---|---|---|---|
| 4,417,763 | 11/1983 | Schlapp et al. | 296/216 |
| 4,619,480 | 10/1986 | Motoyama et al. | 296/217 |
| 4,647,104 | 3/1987 | Kohlpaintner et al. | 296/221 |
| 4,671,565 | 6/1987 | Grimm et al. | 296/216 |
| 4,684,169 | 8/1987 | Igel et al. | 296/221 |

(List continued on next page.)

FOREIGN PATENT DOCUMENTS

| | | |
|---|---|---|
| 3442600 | 5/1986 | (DE) . |
| 3603314 | 6/1987 | (DE) . |
| 3930756 | 3/1991 | (DE) . |
| 9116412 | 2/1993 | (DE) . |
| 44 05 742 | 5/1995 | (DE) . |
| 195 14 585 A1 | 10/1996 | (DE) . |
| 0 033 816 | 8/1981 | (EP) . |
| 0 143 589 | 6/1985 | (EP) . |
| 0 218 890 | 4/1987 | (EP) . |
| 0 343 750 | 11/1989 | (EP) . |
| 0 517 318 A1 | 12/1992 | (EP) . |
| 0 747 249 | 12/1996 | (EP) . |
| 2 495 068 | 6/1982 | (FR) . |
| 2 527 995 | 12/1983 | (FR) . |
| 0278422 | 12/1986 | (JP) . |
| 0104734 | 5/1991 | (JP) . |
| 404297323 | 10/1992 | (JP) . |

OTHER PUBLICATIONS

U.S. application No. 09/553,689, filed Apr. 21, 2000.
U.S. application No. 09/556,192, filed Apr. 21, 2000.
U.S. application No. 09/556,110, filed Apr. 21, 2000.
U.S. application No. 09/530,004, filed Apr. 21, 2000.
U.S. application No. 09/616,168, filed Jul. 14, 2000.
U.S. application No. 09/616,559, filed Jul. 14, 2000.
U.S. application No. 09/661,231, filed Sep. 13, 2000.
"The Woodworkers' Store", 1993–94 Catalog.

*Primary Examiner*—Dennis H. Pedder
(74) *Attorney, Agent, or Firm*—Westman, Champlin & Kelly, P.A.

(57) ABSTRACT

An open roof construction for a vehicle having an opening in its fixed roof comprises a stationary part to be fixed to the roof with guide rails extending in the longitudinal direction of the open roof construction. A panel is adjustable between a closed position, in which it closes the roof opening, and an open position, in which it releases the roof opening at least partially. An operating mechanism for adjustably supporting the panel includes a driving element capable of movement in said guide rails for driving a vertically adjustable part having a guide head present thereon. The guide head engages a link mounted under the panel, which is provided with a guideway in the form of link ribs projecting from the link on either side thereof. The guide head is provided with two opposed grooves being open in a direction towards each other, which function to receive the associated link ribs. In one embodiment, the grooves taper off towards their lateral openings, at least on the upper side, in such a manner that each link rib fits therein with some play at some distance from the lateral opening of the associated groove.

10 Claims, 5 Drawing Sheets

U.S. PATENT DOCUMENTS

| | | | |
|---|---|---|---|
| 4,725,092 | 2/1988 | Reintges et al. | 296/221 |
| 4,752,099 | 6/1988 | Roos et al. | 296/223 |
| 4,877,285 | 10/1989 | Huyer | 296/216 |
| 5,020,849 | 6/1991 | Schlapp et al. | 296/221 |
| 5,058,947 | 10/1991 | Huyer | 296/216 |
| 5,066,068 | 11/1991 | Suzuki et al. | 296/221 |
| 5,259,662 | 11/1993 | Huyer | 296/221 |
| 5,527,085 | 6/1996 | Ochiai et al. | 296/223 |
| 5,593,204 | 1/1997 | Wahl et al. | 296/223 |
| 5,845,959 | 12/1998 | Ueki | 296/221 |

OPEN ROOF CONSTRUCTION FOR A VEHICLE

BACKGROUND OF THE INVENTION

The invention relates to an open roof construction for a vehicle in accordance with the preamble of the independent claims.

Open roof constructions of this kind are known in various versions thereof. Generally, a closure panel includes a link having a rib extending along a length thereof. A guiding head mates with the rib. The guiding head moves along the rib to open and close the closure panel.

The object of the invention is to provide an open roof construction, which embodies an improved construction of the guide head.

SUMMARY OF THE INVENTION

A broad aspect of the invention provides a guide head operable with guideways of a link that allows remarkably smooth movement of the guide head along guideways of the link. The engagement between guide head and link ribs allows minor misalignments without this leading to an accumulation of shearing forces. Production tolerances can be increased without this leading to undesirable play or endangering the functioning of the mechanism in any other manner. In case of incorrect alignment of the link ribs in the longitudinal direction of the panel, negative play will develop, which will quickly lead to the required running fit as a result of the use of plastic material in one embodiment. Shearing forces are more precisely determined and wear characteristics are improved. The wear-in times are reduced.

BRIEF DESCRIPTION OF THE DRAWINGS

The invention will now be explained in more detail with reference to the drawings, which schematically show an exemplary embodiment of the invention.

DETAILED DESCRIPTION OF THE ILLUSTRATIVE EMBODIMENTS

Figure 1:
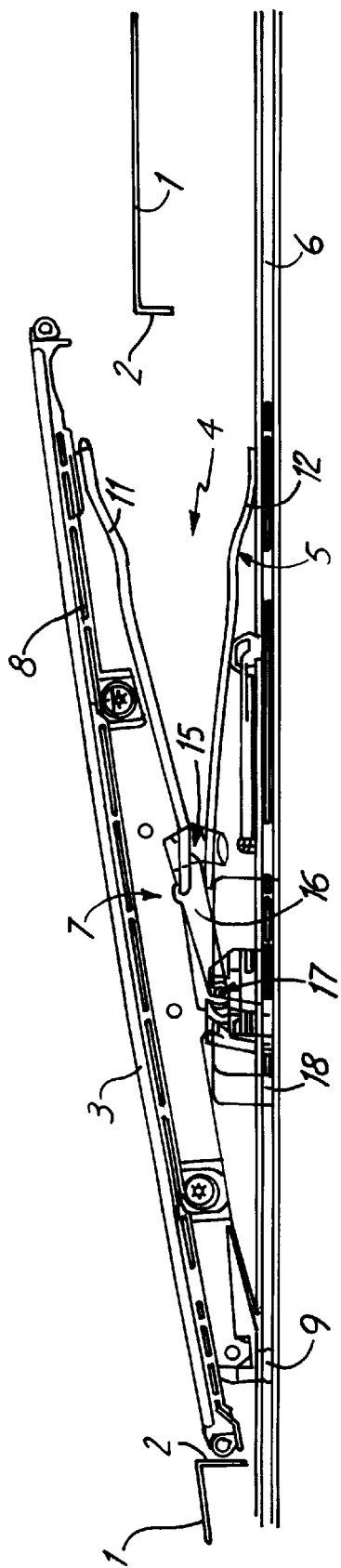
FIG. 1 is a longitudinal sectional view of an embodiment of an open roof construction according to the invention, showing a closure element in an open ventilating position.
Figure 2:
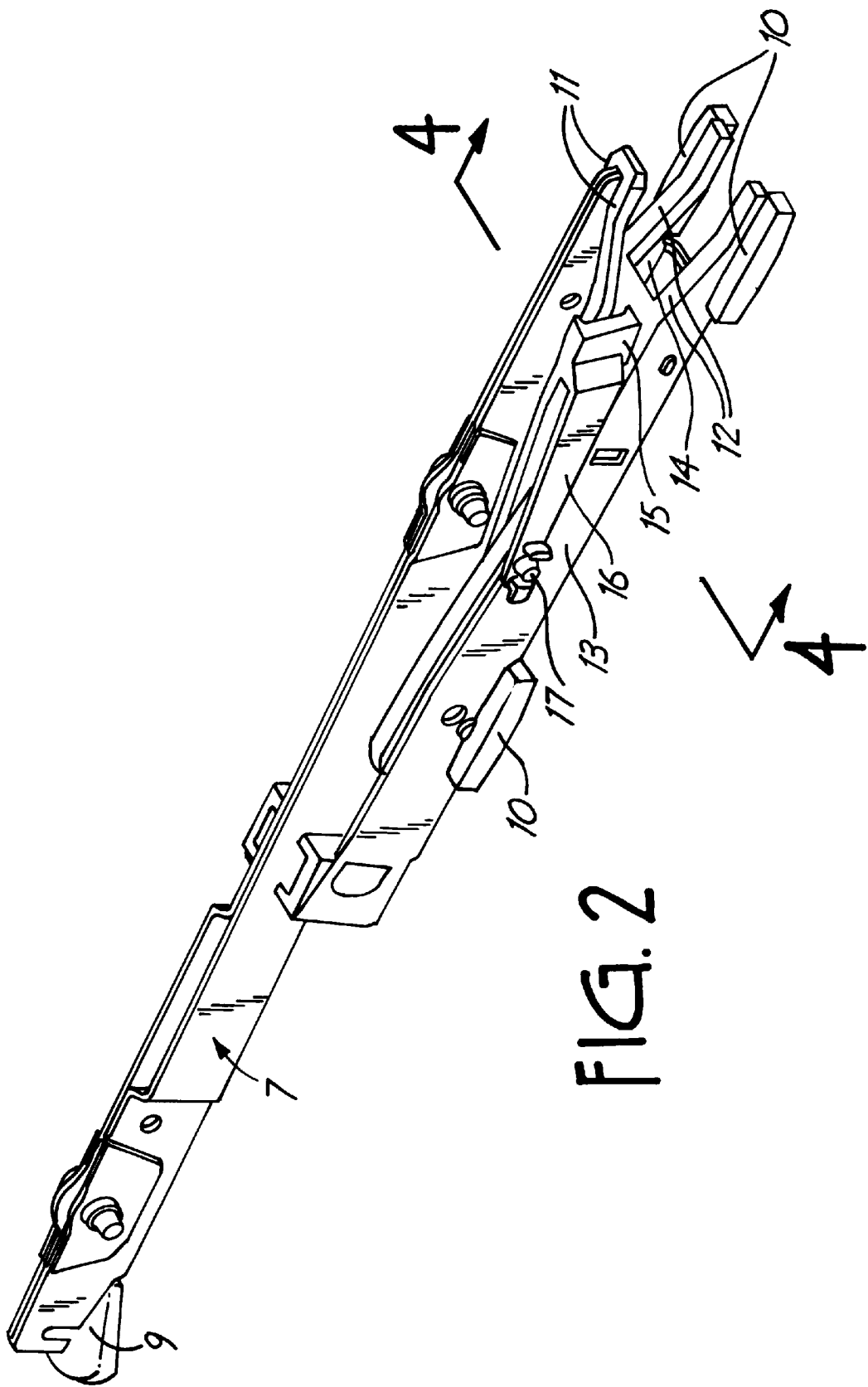
FIG. 2 is a larger-scale perspective view of an operating mechanism on one side of the open roof construction of FIG. 1, showing the closure element in the closed position.

The open roof construction as shown in the drawings constitutes the subject matter of further co-pending patent applications both entitled "Open Roof Construction for a Vehicle" Ser. Nos. 09/016,168, and 09/616,559, filed on even date herewith, the contents of which are incorporated herein by reference.

The drawings show a fixed roof 1 of a vehicle, such as a passenger car, which is provided with a roof opening 2 for receiving an open roof construction. The open roof construction includes a closure element 3 for selectively closing or at least partially releasing the roof opening 2. In this embodiment the closure element 3 is a rigid panel, in particular a transparent panel of glass or plastic material, but other closure elements such as slats or a flexible cover are conceivable. In the illustrated embodiment a sliding-tilt roof is used, wherein panel 3 can be moved from the closed position in roof opening 2 (FIGS. 4, 5), on the one hand to an upwardly and rearwardly sloping ventilating position (FIG. 1) and, on the other hand, downwards (FIG. 5) and subsequently rearwards to a position under the fixed roof 1. Other embodiments are possible, however, such as a spoiler roof or a tilt roof or the like.

In order to enable the movements of panel 3, panel 3 is fitted with an operating mechanism 4 at both edges extending in the longitudinal direction of the open roof construction. In this embodiment, each operating mechanism 4 includes a link slide 5, which is slidably accommodated in a guideway of a guide rail 6. Said guide rail 6 is mounted on or forms part of a stationary part (not shown), for example a frame, which is attached to the fixed roof 1 of the vehicle. The guide rails 6 extend along the longitudinally extending edges of the roof opening 2 and possibly rearwards thereof.

Part of the operating mechanism 4 is made up of a link 7, which is attached to the underside of panel 3, near the respective longitudinal edge. The link 7 can include a stiffening frame 8. At its front end, link 7 is fitted with a sliding shoe 9, which is slidably accommodated in associated grooves in guide rail 6, and which also functions as the front hinge for panel 3. Link slide 5 comprises two pairs of sliding shoes 10, which project laterally and which guide link slide 5 in guide rail 6.

Both link slide 5 and link 7 include guideways in the form of laterally projecting ribs 11, 12, wherein ribs 11 are formed on the lower edge of link 7 and extend away from each other, whilst ribs 12 are formed on the upper side of vertical walls 13, 14 of the link slide 5 and extend towards each other. Link slide 5 and link 7 are formed of die-cut and flanged metal plates. Link ribs 11, 12 can be formed thereon by encapsulating flanges formed on the edge of the metal plates of link 7 and link slide 5 in plastic by means of an injection molding technique. A guide head 15 is in engagement with all ribs 11 and 12, and to that end it engages between the vertical walls 13, 14 of link slide 5 and around link 7. The interspace between the ribs 12 of link slide 5 is larger than the spacing between the outside surfaces of the two ribs 11 of link 7, so that link 7 can at least partially be accommodated between walls 13, 14 of link slide 5 in a lowermost position of panel 3.

Guide head 15 is formed on the free end of an arm 16, which is pivotally connected by means of a pivot 17, to a driving slide 18 (FIG. 1), which is drivingly connected to a drive unit, such as an electric motor, a hand crank or the like, via a pressure-rigid driving cable or the like, as is well known in the art. By moving the guide head 15, which acts as a wedge between link slide 5 and link 7, with respect to guideways 11, 12, link 7 and thus panel 3 will be pivoted about pivot 9. Link slide 5 is stationary during said pivoting. In the lower pivoted position of panel 3, the driving slide 18 is locked in position with respect to link slide 5, after which the entire operating mechanism 4 and panel 3 will move rearwards as one unit upon further rearward movement of the driving slide 18. The specific construction and operation of driving slide 18 and link slide 5 is not necessary for practicing the present invention although these features are described in detail in co-pending applications entitled "Open Roof Construction for a Vehicle", filed Apr. 21, 2000 and assigned Ser. Nos. 09/556,110 and 09/553,689, and 09/556,192, the contents of which are hereby incorporated by reference in their entirety.

Figure 3:
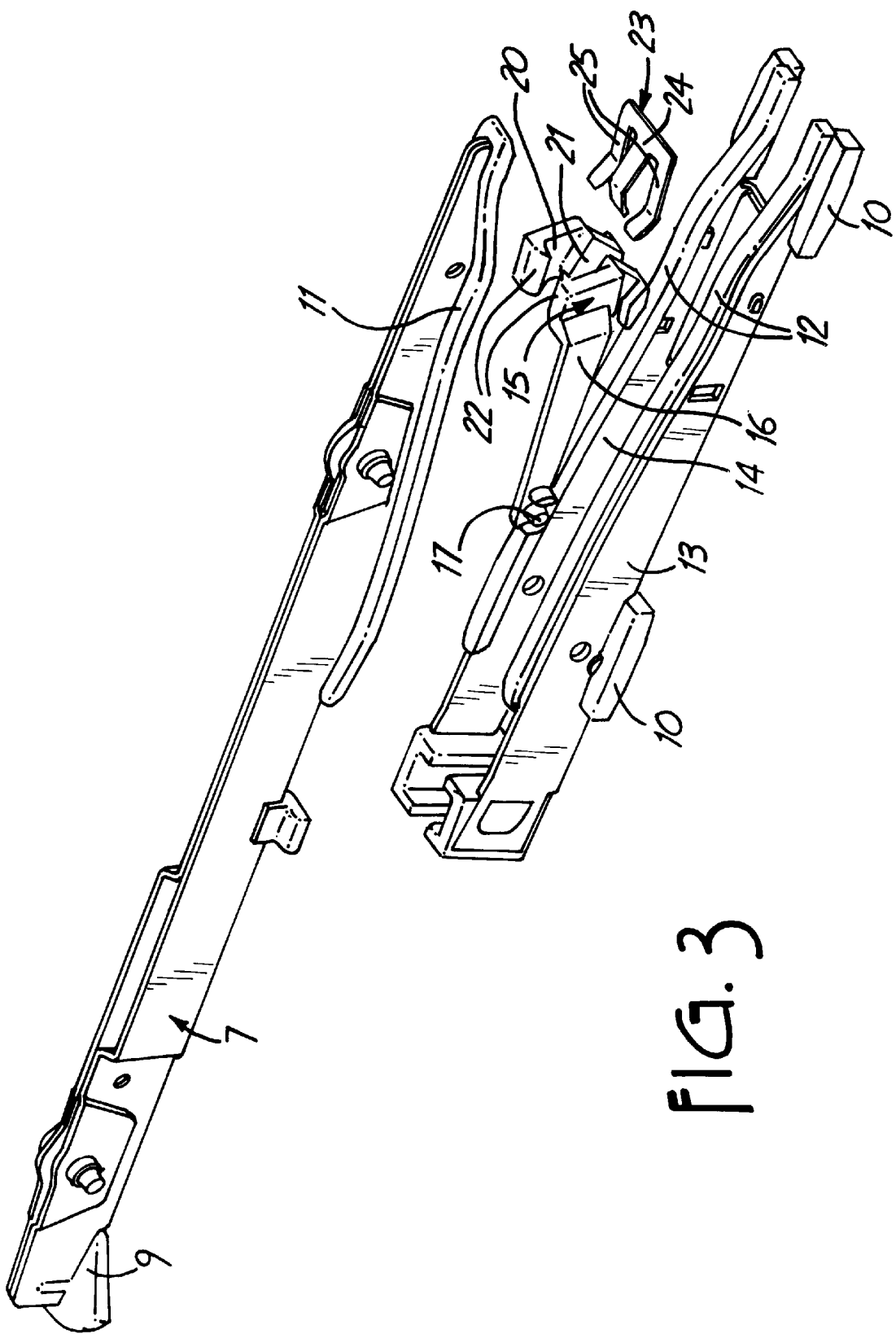
FIG. 3 is a perspective, exploded view of the operating mechanism of FIG. 2.
Figure 4:
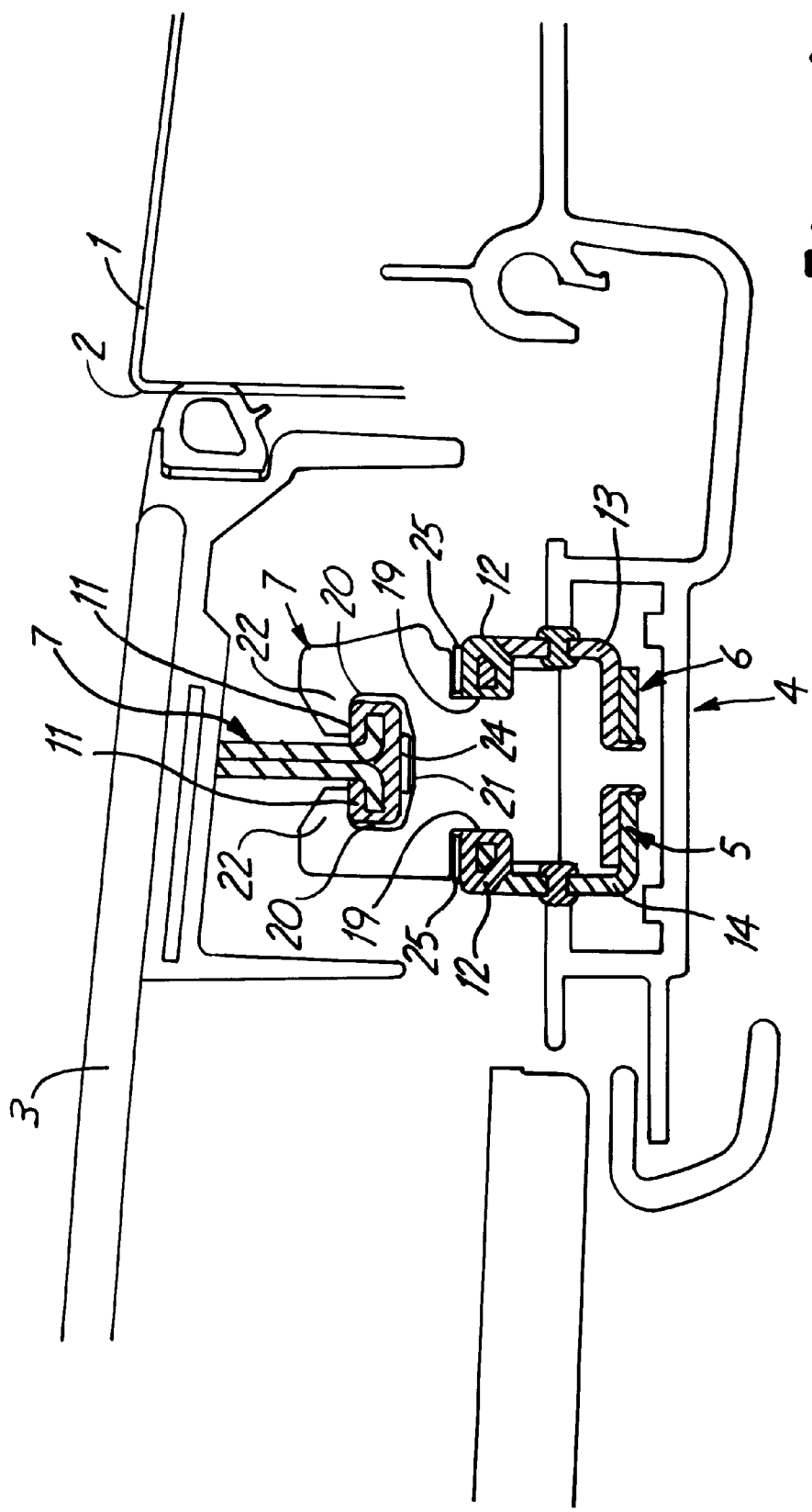
FIG. 4 is a larger-scale view, partially in cross-section, of the open roof construction of FIG. 1 along line IV—IV in FIG. 2.

The construction of the guide head 15, which is preferably made of aluminium, is clearly shown in FIGS. 3 and 4. Guide head 15 comprises a lower portion, which extends between vertical walls 13 and 14 of link slide 5 and which engages ribs 12 of link slide 5 from the inside. To this end, guide head 15 includes a pair of opposed grooves 19 facing away from each other, in which the ribs 12 can be slidably accommodated, so that guide head 15 can slide along ribs 12 and follow the path defined by ribs 12. An upper part of guide head 15 is adapted for engaging the ribs 11 of link plate 7, and to that end guide head 15 includes two opposed grooves 20 facing towards each other, whose bottom walls, in this embodiment, continue via a central portion 21, whilst the upper walls of grooves 20 are formed by cams 22, which leave a space between them for passing link 7.

As is shown in FIGS. 1 and 3, the grooves 19 and 20 do not have straight upper and lower walls in their longitudinal direction, but the upper and lower walls of grooves 19 and 20 diverge widely from a central portion. Thus the ribs 11 and 12 can be received in grooves 19 and 20, respectively, at different angles, such that there is no play in at least one location in grooves 19, 20, which location can vary in dependence on the angle between guide head 15 and the rib 11, 12 in question. Also the height of the ribs 11 and 12 can vary along the length thereof in dependence on the angle which the guide head 15 includes with the ribs 11, 12 in question at a specific location. The upper and lower surfaces of ribs 11, 12 extend substantially horizontally in transverse direction (normal to side walls of grooves 20).

FIG. 4 furthermore shows that the upper wall of the grooves 20 and the lower surface of cams 22 does not extend horizontally in a transverse direction, either, but slope upwards from the lateral opening of grooves 20, in this case at an angle of approx. 2–10 degrees with respect to the horizontal. Also the bottom walls of grooves 20 slope slightly upwards from central portion 21. The height of grooves 20 is such that ribs 11 are accommodated in grooves 20 with some play in a vertical direction at some distance from the lateral opening. In order to prevent rattling of guide head 15 on ribs 11 and 12, a spring element 23 can be provided, which includes a central lip 24 and two outer lips 25, which are interconnected and which include curved parts of spring steel. Central lip 24 is positioned between the central portion 21 of guide head 15 and the underside of ribs 11, whilst the outer lips 25 are positioned between the respective upper wall of grooves 19 and the upper side of ribs 12. The convex portion of lips 24, 25 abuts against the respective rib 11, 12. The spring force developed by spring 23 eliminates any play between guide head 15 and ribs 11, 12, whilst a certain tolerance is provided by the manner in which ribs 11, 12 are accommodated in grooves 20, 19.

In particular in the case of link 7, a certain slope of link 7, for example caused by a varying convexity of the closure element 3, is allowable on account of the oblique upper walls of grooves 20 and the space at the lower side of grooves 20 and the sloping lower walls thereof. Also, sufficient play is present between ribs 11 and grooves 20 in a lateral or transverse direction so as to offset any tolerances. As such larger production tolerances are allowable without affecting the functioning of the operating mechanism. Also when the ribs 12 do not run entirely synchronously to link slide 5 in a longitudinal direction, for example due to a slight shift of the two parts of which the link slide 5 is built up, this can be offset without any problem, without excessive frictional forces, by the guide head 15. A factor that plays a role thereby is that the slope of the ribs 12 with respect to the guide rail 6 is not very large, so that a movement in the longitudinal direction of the two ribs 12 with respect to each other will not result in large differences in height at any specific cross-section of the ribs 12.

Figure 5:
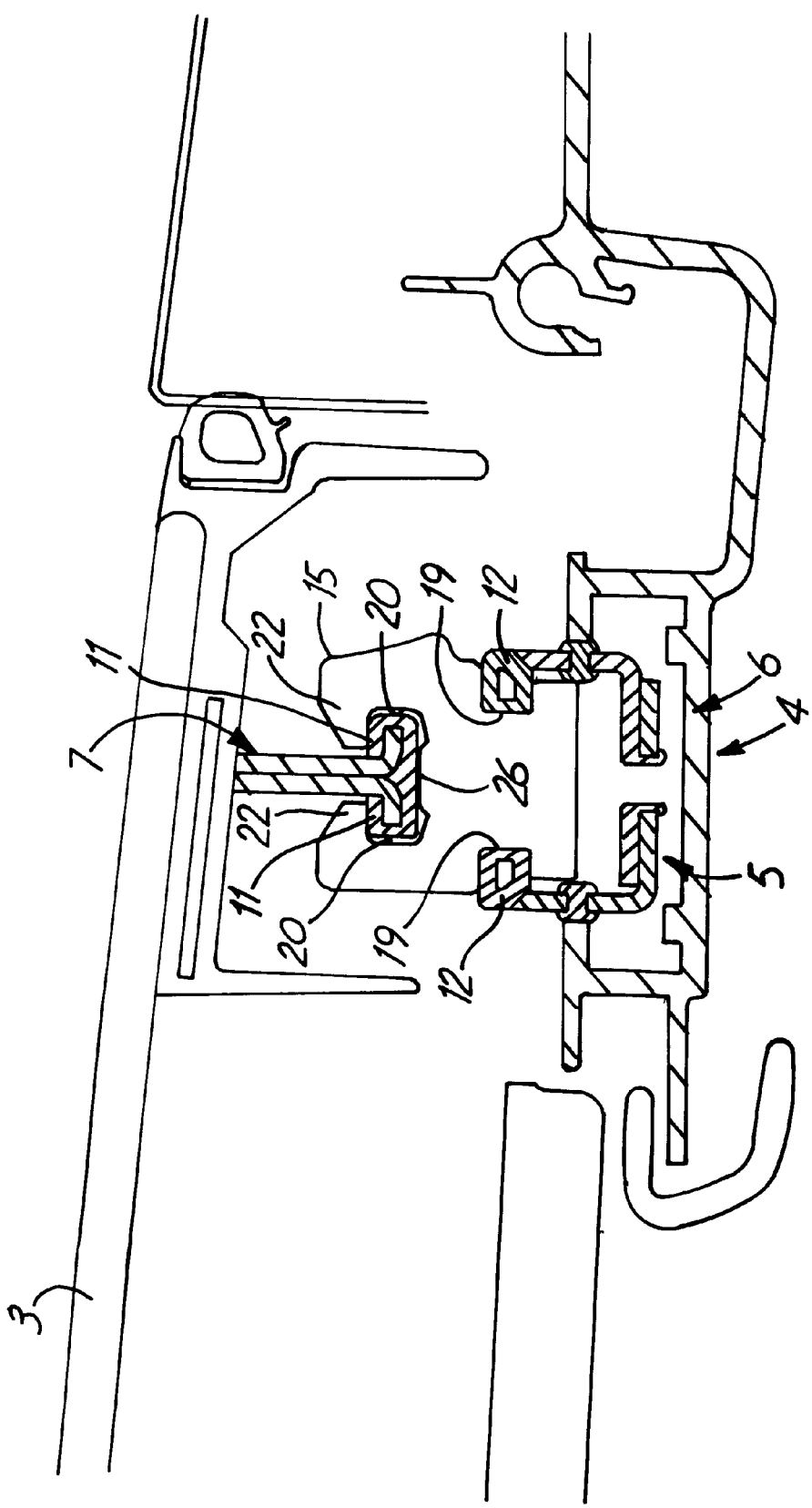
FIG. 5 is a sectional view corresponding to FIG. 4 of an alternative embodiment of the operating mechanism of the open roof construction according to the invention.

FIG. 5 shows an alternative embodiment of the open roof construction according to the invention, wherein spring element 23 has been left out and an elevation or projection 26 has been formed in the central portion 21 of guide head 15, which elevation presses against the underside of ribs 11 and against which the underside of ribs 11 can abut at slightly varying angles so as to offset any obliqueness of link 7. Due to the construction of ribs 11, 12 and guide head 15, a rattle-free guidance without excessive frictional forces, with guide head 15 being worn in quickly, can be achieved also in the case where no spring element 23 is used. This is made possible by the line contacts and the negative play between ribs 11, 12 and the guide head 15. The ribs are preferably made of POM with molybdenum sulphide as an additive, which is conducive to smooth operation.

The invention is not limited to the above-described embodiments as shown in the drawing, which can be varied in several ways without departing from the scope of the invention.

Thus the driving element can also be implemented with other types of open roof constructions, such as tilt roofs and spoiler roofs, louvered roofs and the like. In the case of tilt roofs, for example, the link slide 5 may be stationary and actually form part of the stationary part of the open roof construction.

What is claimed is:

1. An open roof construction for a vehicle having an opening in a fixed roof, comprising:

at least one guide rail extending in a longitudinal direction of the opening;

an adjustable closure element supported by the guide rail, which is adjustable between a closed position, in which it closes the roof opening, and an open position, in which it opens the roof opening at least partially, the closure element having a link extending along an underside of the closure element, the link having a guideway formed of ribs projecting outwardly in opposed directions along a length thereof;

guide head movable relative to the link to cause movement of the closure element, the guide head having grooves adapted to receive the ribs, wherein each groove includes an upper surface that slopes upwardly from a lateral opening toward a central longitudinal axis of the link, and wherein each rib fits in a respective groove with a clearance between the upper surface of the groove and the rib at a location spaced from the lateral opening.

2. The open roof construction according to claim 1, wherein the upper sides of the grooves extend obliquely in a direction of the lateral opening of the grooves, whilst the ribs have an at least substantially horizontal upper surface.

3. The open roof construction according to claim 1, wherein the grooves diverge towards both ends, seen from a central portion thereof.

4. The open roof construction according to claim 1, wherein an element is provided in the guide head in a central portion of the guide head between the grooves, wherein the element abuts against an underside of the link.

5. The open roof construction according to claim 4, wherein the element on the guide head comprises a spring element.

6. The open roof construction according to claim 5, including a second guideway comprising ribs, which is present on a part that is connected to the guide rail, wherein the guide head is in engagement both with the first guideway and with the second guideway.

7. The open roof construction according to claim 6, wherein the spring element is provided both between the guide head and the first guideway and between the guide head and the second guideway.

8. The open roof construction according to claim 6, wherein the second guideway includes two spaced-apart ribs facing towards each other, wherein the spacing between said ribs is larger than a joint width of the ribs of the link , and wherein the guide head fits between the ribs of the second guideway and includes grooves facing away from each other, into which the ribs of the second guideway extend.

9. The open roof construction according to claim 5 and further comprising a link slide adapted for sliding movement in the guide rail, the guide head being coupled to the link slide to cause vertical movement of the closure element.

10. An open roof construction for a vehicle having an opening in a fixed roof, comprising:

at least one guide rail extending in a longitudinal direction of the opening;

an adjustable closure element supported by the guide rail, which is adjustable between a closed position, in which it closes the roof opening, and an open position, in which it opens the roof opening at least partially, the closure element having a link extending along an underside of the closure element, the link having a first guideway formed of ribs projecting outwardly in opposed directions along a length thereof;

a part coupled to the guide rail having a second guideway formed of projecting ribs;

a guide head movable relative to the link to cause movement of the closure element, the guide head having grooves adapted to receive the ribs of the first guideway and the second guideway; and a spring element provided between and in engagement with the guide head and at least one of the first and second guideways.

* * * * *

UNITED STATES PATENT AND TRADEMARK OFFICE
CERTIFICATE OF CORRECTION

PATENT NO. : 6,325,453 B1
DATED : December 4, 2001
INVENTOR(S) : Manders

It is certified that error appears in the above-identified patent and that said Letters Patent is hereby corrected as shown below:

Title page,
Item [56], References Cited, U.S PATENT DOCUMENTS, add the following:
-- 6,164,718    12/2000         Stallfort ...............296/222 --
FOREIGN PATENT DOCUMENTS, add the following:
-- 0 899 140    3/1999   (EP) --

Column 4,
Line 45, insert -- a -- before "guide".

Signed and Sealed this

Twentieth Day of August, 2002

*Attest:*

*Attesting Officer*

JAMES E. ROGAN
*Director of the United States Patent and Trademark Office*